(12) United States Patent
Beaudeau et al.

(10) Patent No.: US 10,581,471 B1
(45) Date of Patent: Mar. 3, 2020

(54) DISTORTION-BASED TECHNIQUES FOR COMMUNICATIONS LOCALIZATION DENIAL

(71) Applicant: BAE Systems Information and Electronic Systems Integration Inc., Nashua, NH (US)

(72) Inventors: Jonathan P. Beaudeau, Littleton, MA (US); Prabahan Basu, Lexington, MA (US); David J. Couto, Pepperell, MA (US); William D. Watson, Pepperell, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/173,672

(22) Filed: Oct. 29, 2018

(51) Int. Cl.
*H04B 1/04* (2006.01)
*H04L 25/08* (2006.01)

(52) U.S. Cl.
CPC .......... *H04B 1/0475* (2013.01); *H04L 25/08* (2013.01)

(58) Field of Classification Search
CPC ............................. H04B 1/0475; H04L 25/08
See application file for complete search history.

(56) References Cited

U.S. PATENT DOCUMENTS

| 8,610,499 B2* | 12/2013 | Royer | H03F 1/3247 330/149 |
| 9,722,646 B1* | 8/2017 | Matthews | H04B 1/0475 |
| 2006/0062324 A1* | 3/2006 | Naito | H03C 3/406 375/296 |
| 2012/0269293 A1* | 10/2012 | Peng | H04B 1/0475 375/297 |

(Continued)

FOREIGN PATENT DOCUMENTS

KR 2001100221052 * 3/2001

OTHER PUBLICATIONS

G. D. Weeks et al., "A Method and Metric for Quantitatively Defining Low Probability of Detection", IEEE Military Communications Conference, Oct. 19-21, 1998, Boston, MA, Proceedings. MILCOM 98 (Cat. No. 98CH36201), vol. 3, IEEE, pp. 821-826.

(Continued)

*Primary Examiner* — Jean B Corrielus
(74) *Attorney, Agent, or Firm* — Finch & Maloney PLLC; Scott J. Asmus

(57) ABSTRACT

An electronic transmitter includes: a generator circuit to generate a baseband signal; a modulator circuit to modulate a carrier signal with the baseband signal; an emitter to emit the modulated signal at an intended recipient; and a distortion circuit to apply a final distortion to the baseband signal or the modulated signal. The final distortion is optimized to minimize the ability of unintended recipients to localize the emitter using correlation-based techniques, and to minimize any degradation to the data rate of the emitted signal at the (Continued)

intended recipient. In some cases, the transmitter is part of an electronic communication system that also includes a receiver at the intended recipient. The receiver is aware of the final distortion and includes a collector to collect the emitted signal, and a demodulator circuit to demodulate the collected signal using the final distortion to recover the baseband signal.

22 Claims, 11 Drawing Sheets

(56) References Cited

U.S. PATENT DOCUMENTS

| | | | |
|---|---|---|---|
| 2014/0254716 A1* | 9/2014 | Zhou | H03F 1/3247 375/296 |
| 2014/0254720 A1* | 9/2014 | Deng | H04L 25/03343 375/297 |
| 2014/0269988 A1* | 9/2014 | Schafferer | H03F 1/30 375/296 |
| 2015/0103952 A1* | 4/2015 | Wang | H04L 27/368 375/297 |
| 2016/0094253 A1* | 3/2016 | Weber | H03F 1/3247 455/114.3 |

OTHER PUBLICATIONS

Boulat A. Bash et al., "Square Root Law for Communication with Low Probability of Detection on AWGN Channels", 2012 IEEE International Symposium on Information Theory Proceedings, Jul. 1-6, 2012, Cambridge, MA, IEEE, pp. 448-452.

Leon E. Smith, "Modulation Choices for LPI/LPD Communication Systems", Proceedings of TCC'94—Tactical Communications Conference, May 10-12, 1994, Fort Wayne, IN, Digital Technology for the Tactical Communicator, vol. 1, IEEE, p. 519.

Ralph Schoolcraft, "Low Probability of Detection Communications—LPD Waveform Design and Detection Techniques", MILCOM '91—Conference record, Nov. 4-7, 1991, McLean, VA, IEEE, vol. 2, pp. 832-840.

Raymond L. Pickholtz et al., "Theory of Spread-Spectrum Communications—A Tutorial", IEEE Transactions on Communications, May 1982, vol. 30, No. 5, IEEE, pp. 855-884.

Steven M. Kay, "Fundamentals of Statistical Signal Processing: Estimation Theory", 1997, Prentice Hall, Upper Saddle River, NJ, 595 pages.

Seymour Stein, "Algorithms for Ambiguity Function Processing", IEEE Transactions on Acoustics, Speech, and Signal Processing, Jun. 1981, vol. 29, No. 3, IEEE, pp. 588-599.

Robert Mcaulay et al., "A Useful Form of the Barankin Lower Bound and Its Application to PPM Threshold Analysis", IEEE Transactions on Information Theory, Mar. 1969, vol. 15, No. 2, IEEE, pp. 273-279.

Kristine L. Bell et al., "Extended Zivzakai Lower Bound for Vector Parameter Estimation", IEEE Transactions on Information Theory, Mar. 1997, vol. 43, No. 2, IEEE, pp. 624-637.

E. W. Barankin, "Locally Best Unbiased Estimates", The Annals of Mathematical Statistics, 1949, vol. 20, No. 4, pp. 477-501.

Ariela Zeira et al., "Realizable Lower Bounds for Time Delay Estimation", IEEE Transactions on Signal Processing, Nov. 1993, vol. 41, No. 11, IEEE, pp. 3102-3113.

Daniel W. Bliss, "Cooperative Radar and Communications Signaling: The Estimation and Information Theory Odd Couple", 2014 IEEE Radar Conference, May 19-23, 2014, Cincinnati, OH, IEEE, pp. 50-55.

Jeremy T. Reed et al., "Gaussian Multiple Access Channels for Radar and Communications Spectrum Sharing", 2016 IEEE Radar Conference, May 2-6, 2016, Philadelphia, PA, IEEE, pp. 1-6.

Mark R. Bell, "Information Theory and Radar Waveform Design", IEEE Transactions on Information Theory, Sep. 1993, vol. 39, No. 5, IEEE, pp. 1578-1597.

P. M. Woodward, "Theory of Radar Information", Transactions of the IRE Professional Group on Information Theory, Feb. 1953, vol. 1, No. 1, pp. 108-113.

K. F. Man et al., "Genetic Algorithms: Concepts and Applications", IEEE Transactions on Industrial Electronics, Oct. 1996, vol. 43, No. 5, IEEE, pp. 519-534.

* cited by examiner

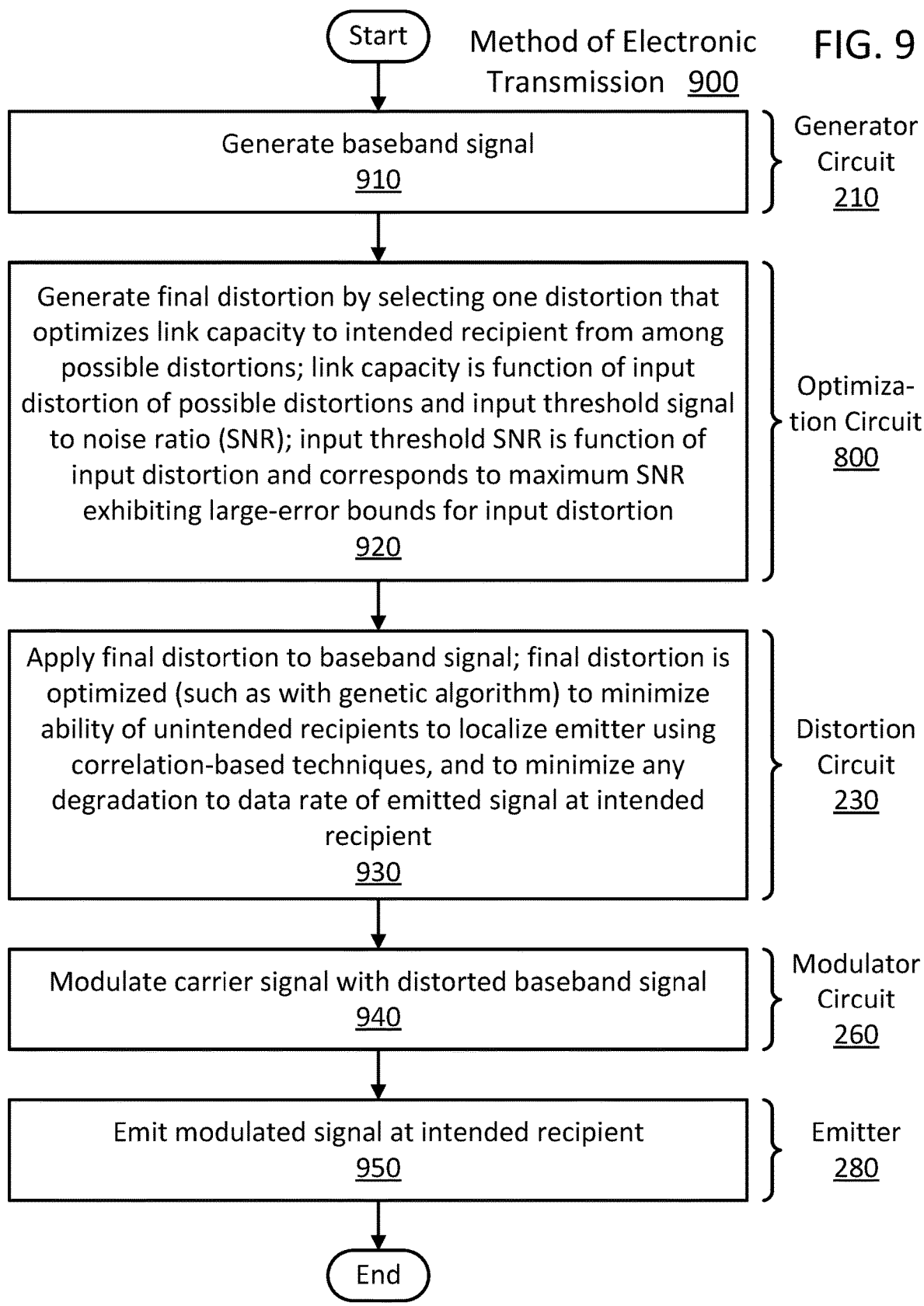

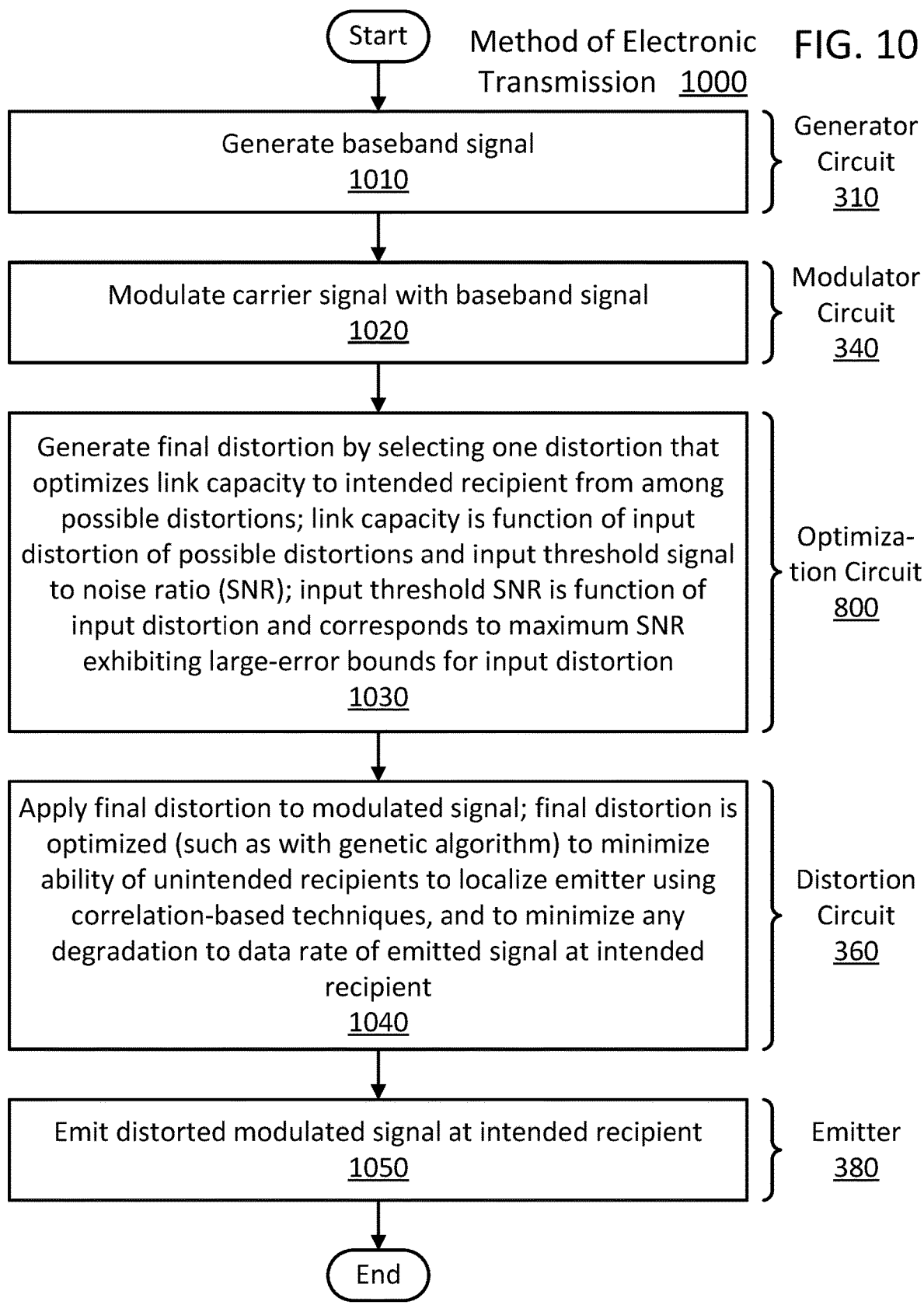

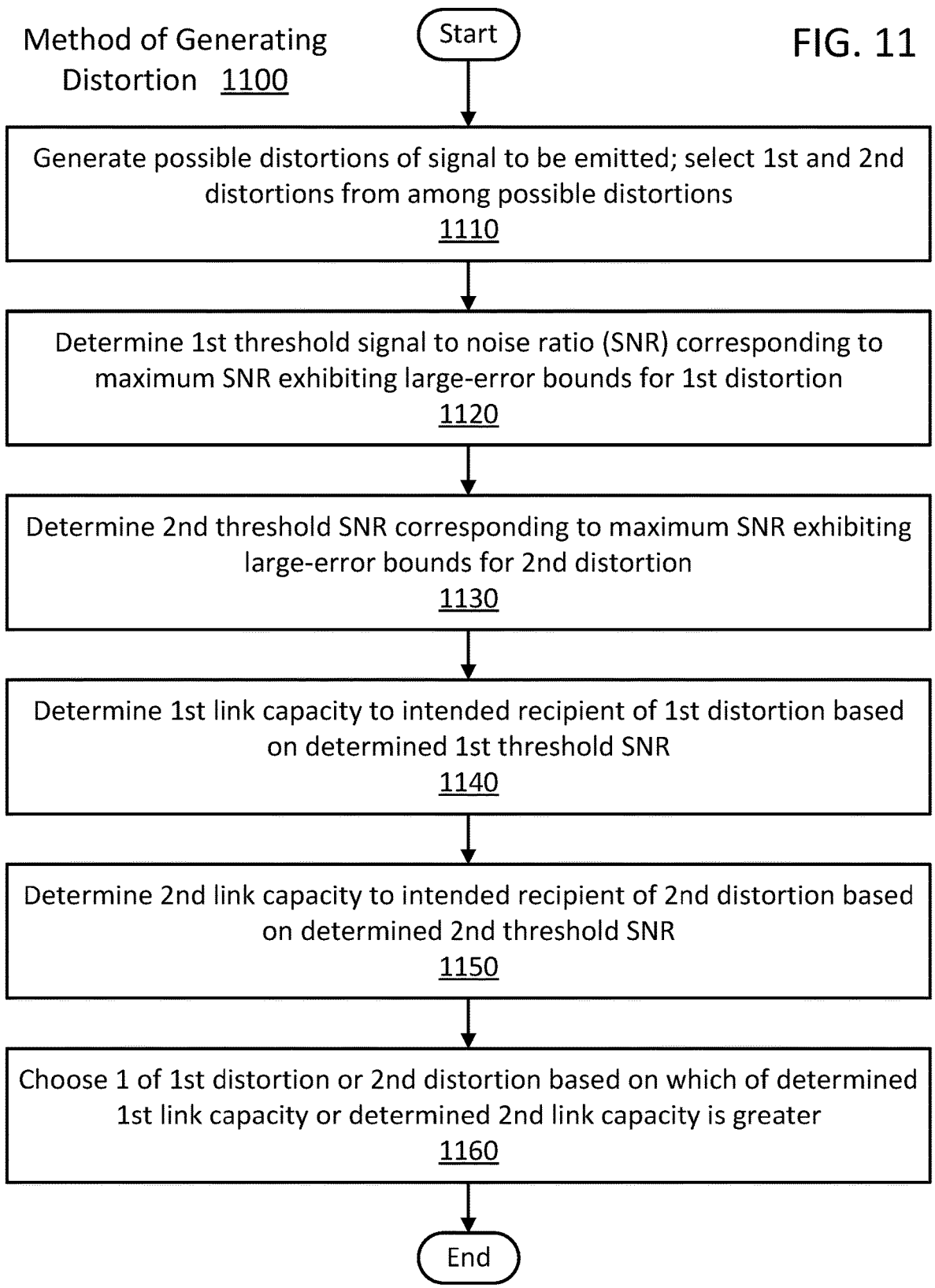

DISTORTION-BASED TECHNIQUES FOR COMMUNICATIONS LOCALIZATION DENIAL

FIELD OF THE DISCLOSURE

This disclosure relates to distortion-based techniques for communications localization denial.

BACKGROUND

Electromagnetic waveforms are emitted as signals in a variety of communication applications. In these applications, the emitted signals reach intended recipients, who collect and process the signals. While these signals convey useful information to the intended recipients, the emissions may also be detectable by other receivers in the paths of the emissions. Such detections can lead to unintended uses of the signals. Accordingly, there are a number of non-trivial issues associated with such emissions.

BRIEF DESCRIPTION OF THE DRAWINGS

FIG. 9 is a flow diagram of an example method of electronic transmission using a distortion-based technique for communications localization denial, according to an embodiment of the present disclosure.

FIG. 10 is a flow diagram of an example method of electronic transmission using a distortion-based technique for communications localization denial, according to another embodiment of the present disclosure.

FIG. 11 is a flow diagram of an example method of electronic generation of a final distortion for communications localization denial by applying to a signal to be emitted from an electronic transmitter at an intended recipient, according to an embodiment of the present disclosure.

Figure 1:
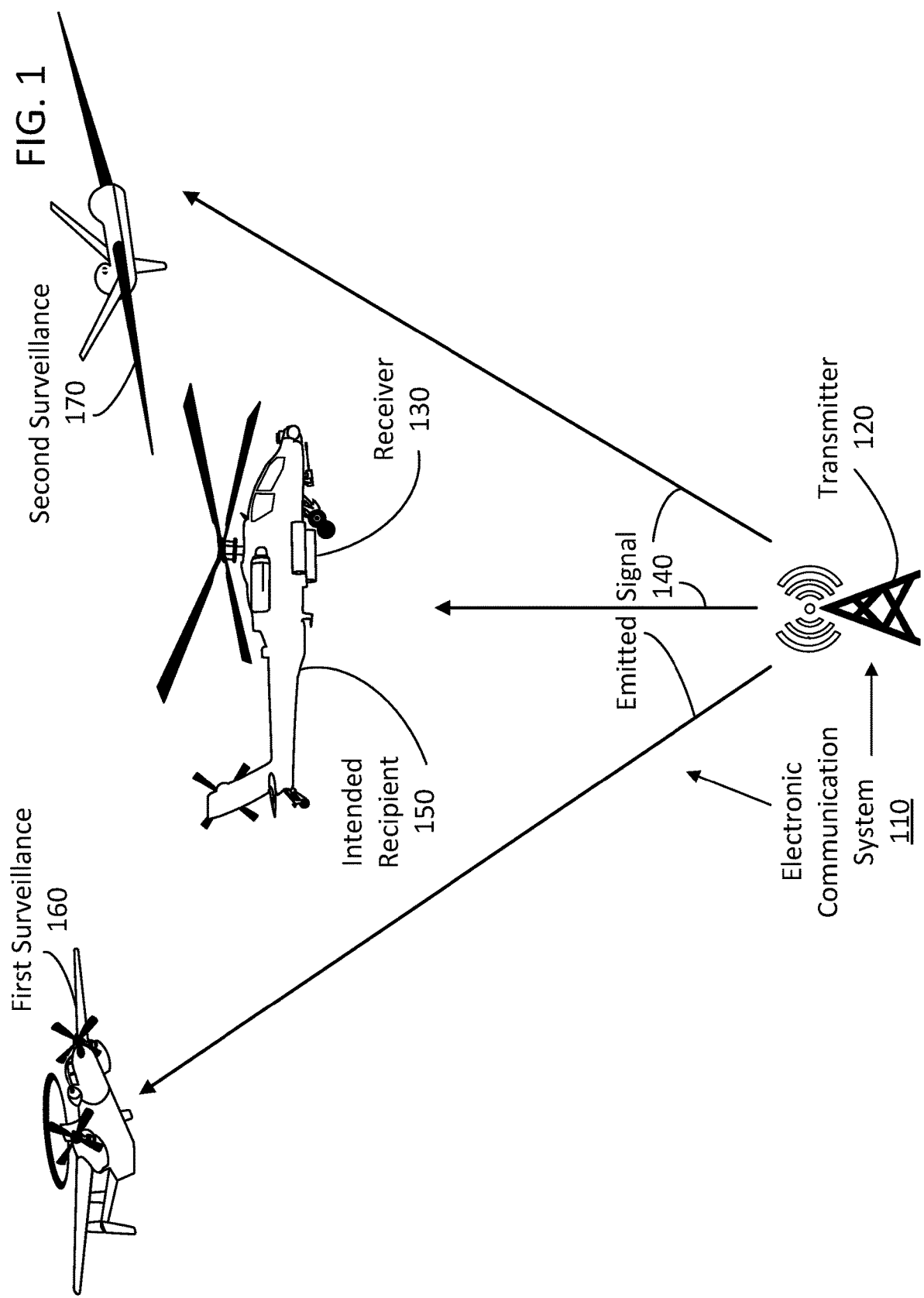
FIG. 1 is a schematic diagram of an example use case for an electronic communication system having a transmitter using a distortion-based technique for communications localization denial, according to an embodiment of the present disclosure.

Although the following Detailed Description will proceed with reference being made to illustrative embodiments, many alternatives, modifications, and variations thereof will be apparent to those in light of the present disclosure.

DETAILED DESCRIPTION

According to various embodiments of the present disclosure, distortion techniques (such as linear distortion filtering) are applied to exploit large-error estimation performance bounds and guarantee significant degradation of an unintended or passive interceptor that is performing correlation-based localization techniques, such as geolocation. In some embodiments, an optimization formulation allows the distortion to be designed so that communications performance degradation is minimized while continuing to thwart localization attempts.

According to some embodiments of the present disclosure, an electronic transmitter is provided. In some embodiments, the transmitter is for an electronic communication system. The transmitter includes a generator circuit to generate a baseband signal, a modulator circuit to modulate a carrier signal with the baseband signal, and an emitter to emit the modulated signal at an intended recipient. The transmitter also includes a distortion circuit to apply a distortion (such as a linear distortion) to the baseband signal or the modulated signal. The distortion imparts bad autocorrelation properties on the emitted signal (which thwart localization attempts), but not so bad as to impart significant degradation to the information transfer rate between the transmitter and the intended recipient. For instance, the transmitter can use the distortion circuit to create artificial bounces in the signal, imparting a sequence of bad echoes, so that information may still transfer, but its timing can prove difficult to place. This timing inaccuracy can foil localization attempts, such as to geolocate or track the emitted signal.

For example, in some embodiments, the distortion is optimized to minimize the ability of unintended recipients to localize (e.g., geolocate) the emitter using correlation-based techniques, and to minimize any degradation to the data rate of the emitted signal at the intended recipient. In some such embodiments, a genetic algorithm circuit optimizes the distortion using a genetic algorithm. In some embodiments, an electronic communication system includes the transmitter along with a receiver at the intended recipient. The receiver includes a collector to collect the emitted signal, and a demodulator circuit to demodulate the collected signal to recover the baseband signal. The receiver is aware of the distortion, and the collector and demodulator circuit are configured to use this knowledge of the distortion to recover the baseband signal from the collected signal.

General Overview

As mentioned above, there are a number of non-trivial issues associated with emissions of signals composed of electromagnetic waveforms. While such emissions have useful applications, the emissions can also be detected, intercepted, or exploited by any recipient in the path of the emissions. Such unintended reception can be used, for example, to detect the presence of the emissions, to decipher the structure or contents of the emissions, or to localize the source of the emissions, to name a few of the potentially unintended uses of the signals. Signals can be made more difficult to detect (and by extension, intercept or exploit) by spreading their transmission at lower power over a greater frequency bandwidth. However, this spread spectrum approach significantly reduces spectral efficiency (e.g., the efficiency at which a communication bandwidth is utilized between a transmitter and an intended recipient). On the other hand, while narrowing the transmission bandwidth greatly increases spectral efficiency, it also increases signal to noise ratio (SNR) of the transmitted signal past the threshold at which localization by unintended recipients can no longer be stopped. Once an emitter's location is known, that emitter can be targeted by adversarial forces. To this end, the ability to thwart or otherwise inhibit the interception of transmitted signals as well as the geolocation or tracking of their emitter is desirable from a tactical standpoint.

Thus, and in accordance with various embodiments, single-antenna techniques are provided that can be used to significantly degrade adversarial passive localization (e.g., geolocation and tracking), such as within the context of tactical communications links. For example, localization performance measures based on large-error estimation bounds are established along with information theoretic constructs, and these measures are manipulated through application of distortion techniques to a communications signal. As a result, in some embodiments, optimizations that allow one to maximize this localization degradation while simultaneously maximizing attainable communications throughput are formulated and solved using a genetic algorithm. Some embodiments of the present disclosure achieve at least an order of magnitude gain over conventional spread-spectrum techniques for reducing detectability of electromagnetic communications and without significantly reducing communication throughput.

In some example embodiments, a baseband signal is generated, a carrier signal is modulated by the baseband signal, and the modulated signal is emitted at an intended recipient. In addition, a distortion is applied to the baseband signal or the modulated signal. The distortion imparts bad autocorrelation properties on the emitted signal, making it difficult to localize the signal through passive techniques. However, the bad autocorrelation properties are not so bad as to significantly degrade the data transfer rate between the transmitter and the intended receiver using the emitted signal. In some embodiments, the distortion includes artificial bounces of the baseband signal (e.g., sequences of bad echoes of the signal) carefully inserted into the signal, which still allow the signal to be received and reconstructed, but foil attempts to localize, such as geolocate (e.g., for a relatively stationary transmission source) or track (e.g., for a moving transmission source), using correlation-based techniques.

In some embodiments, the distortion is optimized (such as through use of a genetic algorithm) to minimize the ability of unintended recipients to localize (such as passively localize) the emitter using correlation-based techniques, and to minimize any degradation to the data rate of the emitted signal at the intended recipient. The distortion thus thwarts efforts (e.g., by unintended recipients or through unintended use) to detect, intercept, or exploit the emitted signal, such as to geolocate the source of the emitted signal. In an embodiment, an electronic communication system includes the transmitter, and further includes a receiver at the intended recipient. The receiver includes a collector to collect the emitted signal, and a demodulator circuit to demodulate the collected signal to recover the baseband signal. The receiver is aware of the distortion and configured to use this awareness to recover the baseband signal from the emitted signal.

In some embodiments, the distortion-based technique (for communications localization denial) includes generating a waveform shape (e.g., an optimized waveform shape to minimize localization while maximizing data throughput subject to this minimized localization). In further detail, such techniques include generation of the underlying waveform itself to produce the same effect as distortion. For example, this can be done by generating a bank of multiple modulated baseband signals (through modulation types such as root-raised-Cosine phase-shift-keying or minimum-shift-keying), mixing each individual baseband signal to different frequencies such that the resulting intermediate frequency subcarriers are spaced apart by specific frequencies, then adding all individual signals together to create one composite signal to be transmitted at a radio frequency (RF). Numerous other example embodiments and configurations will be apparent in light of this disclosure.

System Architecture

FIG. 1 is a schematic diagram of an example use case for an electronic communication system 110 having a transmitter 120 using a distortion-based technique for communications localization denial, according to an embodiment of the present disclosure. In FIG. 1, a receiver 130 is at an intended recipient 150 of an emitted signal 140, allowing the transmitter 120 to communicate with the intended recipient 150. For example, the transmitter 120 can generate a baseband signal, modulate a carrier signal with the baseband signal, apply the distortion at some point, and emit the modulated signal (as the emitted signal 140) at the intended recipient 150. Meanwhile, the receiver 130 can collect the emitted signal 140 and demodulate the collected signal to recover the baseband signal.

However, because of the transmission or broadcast pattern of the emitted signal 140, unintended recipients including first surveillance 160 and second surveillance 170 may also be able to receive the emitted signal 140. For example, the first surveillance 160 and the second surveillance 170 may be able to detect, intercept, or exploit the emitted signal 140. While there are many possible unintended uses of the emitted signal 140 by the first surveillance 160 and the second surveillance 170, for ease of description, embodiments of the present disclosure are described in terms of three general classes (reception, interception, and exploitation) of unintended use. However, in other embodiments, other unintended uses are also included, as would be apparent in light of the present disclosure.

When referring to the detection of the emitted signal 140 in the present disclosure, the unintended use is the observation of the emitted signal 140 (e.g., being aware of the emitted signal 140, such as being able to separate or discern the emitted signal 140 from other electromagnetic radiation). By contrast, when referring to the interception of the emitted signal 140 in the present disclosure, the unintended use is the ability to determine features of the emitted signal 140, such as features that allow identification of the type, format, demodulated form, and perhaps even content of the emitted signal 140. In other words, while detection allows one to know that there is an emitted signal 140 being used for communication or some other similar use, interception provides clues as to the intended use, form, and content of the emitted signal 140. By further contrast, when referring to the exploitation of the emitted signal 140 in the present disclosure, the unintended use is the ability to localize (such as passively localize) the transmitter 120 of the emitted signal 140, such as through correlation-based techniques.

While interception or exploitation of the emitted signal 140 implies detection of the emitted signal 140, the detection of the emitted signal 140 does not imply interception or exploitation of the emitted signal 140. In addition, the interception of the emitted signal 140 can take place independently of the exploitation of the emitted signal 140. That is, the first surveillance 160 and the second surveillance 170 may be able to intercept the emitted signal 140 but not exploit the signal, or the first surveillance 160 and the second surveillance 170 may be able to exploit the emitted signal 140 but not intercept the signal, or the first surveillance 160 and the second surveillance 170 may be able to both intercept the emitted signal 140 and exploit the signal.

In some embodiments, the transmitter 120 generates a baseband signal, modulates a carrier signal with the baseband signal, and emits the modulated signal at the intended recipient 150. In addition, the transmitter applies a distortion to the baseband signal or the modulated signal. The distortion is optimized (such as by using a genetic algorithm) to minimize the ability of unintended recipients (such as the first surveillance 160 and the second surveillance 170) to localize the transmitter 120 using correlation-based techniques, and to minimize any degradation to the data rate of the emitted signal 140 at the intended recipient 150. In some such embodiments, the receiver 130 collects the emitted signal 140 and demodulates the collected signal to recover the baseband signal. Accordingly, while the first surveillance 160 and the second surveillance 170 may receive the emitted signal 140 and attempt to localize (such as geolocate) the transmitter 120 using one or more correlation-based techniques, the distortion applied to the emitted signal 140 makes it difficult to coordinate such efforts and localize the transmitter 120 from the received signals.

Figure 2:
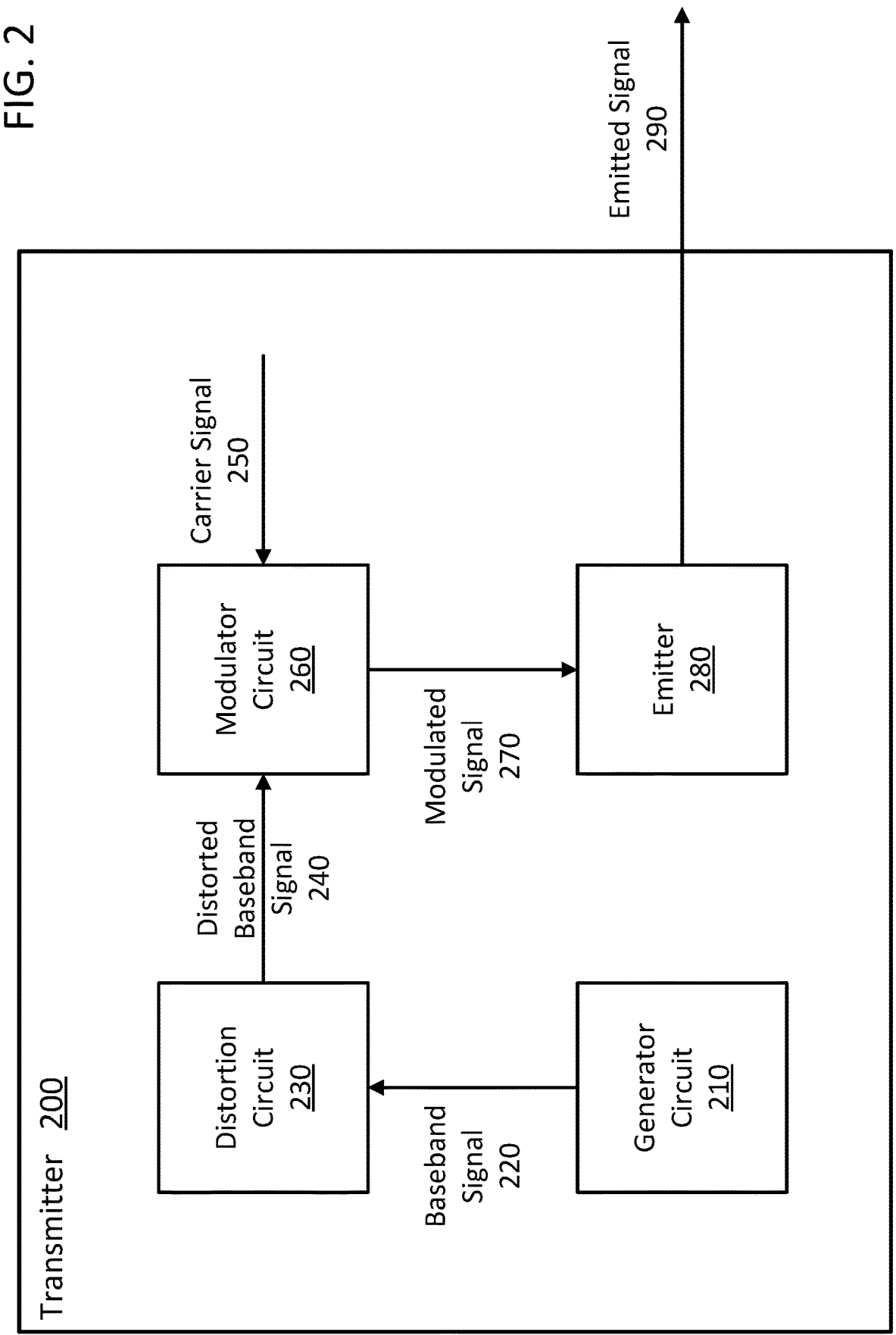
FIG. 2 is a block diagram of an example electronic transmitter using a distortion-based technique for communications localization denial, according to an embodiment of the present disclosure.

FIG. 2 is a block diagram of an example electronic transmitter 200 using a distortion-based technique for communications localization denial, according to an embodiment of the present disclosure. Portions of the transmitter 200 and other electronic components and techniques described herein can be implemented as (or on) an electronic processing component, such as a computer, a field programmable gate array (FPGA), a microprocessor, or the like. For example, portions of the transmitter 200 and other components or methods can be implemented in hardware or software, or some combination of the two. For instance, portions of the transmitter 200 can be implemented as a microprocessor with instructions encoded therein that, when executed, cause the microprocessor to carry out some of the tasks of the transmitter 200. In another embodiment, portions of the transmitter 200 may be implemented as a custom circuit such as a field programmable gate array (FPGA) configured to carry out these tasks. In a further example, there are one or more memory units (such as non-volatile memory units) that is or are coupled to the processing component.

For example, portions of the transmitter 200 and other circuits disclosed herein may be custom hardware circuits or general-purpose computer hardware configured (e.g., through software, firmware, customized logic, to name a few) to carry out the tasks assigned to the circuit. While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit.

As will be further appreciated, a circuit as used herein is a physical structure capable of carrying out one or more functionalities as variously provided herein, whether the structure be hardware only such as purpose-built semiconductor (e.g., gate-level logic or application specific integrated circuit) or a printed circuit board populated with discrete components configured and arranged to carry out the various functionalities provided herein, or a processor-based system programmed with computer code or instructions that are executable by the processor-based system to carry out the various functionalities provided herein, or a combination of such hardware and software based architectures (e.g., printed circuit board with one or more embedded routines executable by one or more processors). Numerous such embodiments and configurations will be appreciated in light of this disclosure.

Continuing with FIG. 2, a generator circuit 210 generates a baseband signal 220 containing information content for an intended recipient. The information may be, for example, compressed or uncompressed, encrypted or unencrypted, or the like. A distortion circuit 230 (such as a distortion filter, as in a linear distortion filter) applies a distortion (such as a digital linear distortion or a digital nonlinear distortion) to the baseband signal 220, to generate a distorted baseband signal 240. The distortion imparts bad autocorrelation properties on the baseband signal 240, making it challenging for interceptors of the signal (after it is broadcast, such as emitted signal 290) to determine or correlate when particular portions of the signal are being sent, and when the interceptors are merely intercepting distorted versions of these portions of the signal. As a result, correlation-based techniques (such as those that autocorrelate the intercepted signal to reveal consistent portions of the signal across multiple unintended recipients) are thwarted, as different recipients correlate different portions or times of the received signal. This thwarts most known ways to passively localize the transmitter 200 across multiple unintended recipients.

Continuing with the transmitter 200, a modulator circuit 260 modulates a carrier signal 250 with the distorted baseband signal 240, to generate a modulated signal 270. An emitter 280 emits the modulated signal 270 (as the emitted signal 290) at the intended recipient. For instance, the emitter 280 may amplify the modulated signal 270, and use the amplified signal to drive an antenna, which emits the emitted signal 290.

In one or more embodiments, the distortion is optimized to minimize the ability of unintended recipients to localize the emitter 280 using correlation-based techniques and to minimize any degradation to the data rate of the emitted signal 290 at the intended recipient. For instance, unintended recipients of the emitted signal 290 may attempt to localize the emitter 280 by doing autocorrelation processing of received copies of the emitted signal 290. However, the distortion thwarts such efforts by making it difficult for such techniques to identify consistent points in the emitted signal 290 between recipients.

In some embodiments, the distortion circuit 230 is a linear transformation applied digitally to the baseband signal 220. The distortion circuit 230 imparts artificial bounces into the baseband signal 220 (such as a sequence of bad echoes), before and after the real signal, so that localization of the corresponding emitted signal becomes more difficult. While this still allows information to transfer, it disrupts attempts to determine consistent times of the signal. This makes it difficult to correlate the received signals between recipients. In some such embodiments, the distortion is optimized using a genetic algorithm. For example, the optimization can generate numerous distortions of the baseband signal 220, each having the desired bad effects on the autocorrelation properties of the signal, and select from among these distortions the one having the least impact on the data transfer rate with an intended recipient.

In some embodiments, the distortion circuit 230 introduces echoes or false bounces to the baseband signal 220. These false portions can be inserted before or after the corresponding actual portions of the baseband signal 220. As a result of these false portions, localization attempts (such as geolocation or tracking) become more difficult. Such attempts usually rely on correlation techniques (such as autocorrelation techniques), which compare time-delayed versions of the signal to determine when the signal is actually sent. However, when strong false bounces are introduced into the baseband signal 220, it becomes difficult to determine from the corresponding emitted signal 290 when information is actually being sent (as opposed to echoes of the information being sent). This foils localization (such as geolocation and tracking) techniques, yet does not necessarily make it too difficult to figure out what is being sent on the receiving end. For instance, the information from the baseband signal 220 can transfer with little degradation, but the timing of the information transfer may be compromised.

For example, in some embodiments, an optimization technique (such as a genetic algorithm) is used to find, among numerous distortions imparting bad autocorrelation properties on the baseband signal 220, which such distortion is least disruptive to the data transfer rate with an intended recipient. As such, the optimization problem reduces to maximizing the disruption to localization techniques (e.g., distorting the baseband signal 220 by imparting bad autocorrelation properties on the signal) while minimizing the data transfer degradation resulting from such distortion. In some other embodiments, other optimization techniques are used to solve this problem.

The intended recipient may have a receiver to receive the emitted signal 290. The receiver can include a collector to collect the emitted signal, and a demodulator circuit to demodulate the collected signal to recover the baseband signal. There are numerous ways that the receiver may collect and demodulate the emitted signal, such as using an equalizer to unfilter (e.g., undo the effects of the distortion), or using orthogonal frequency division multiplexing (OFDM) to modulate the emitted signal (e.g., through numerous narrow band messages), or using a rake receiver at the intended recipient, to name a few.

Figure 3:
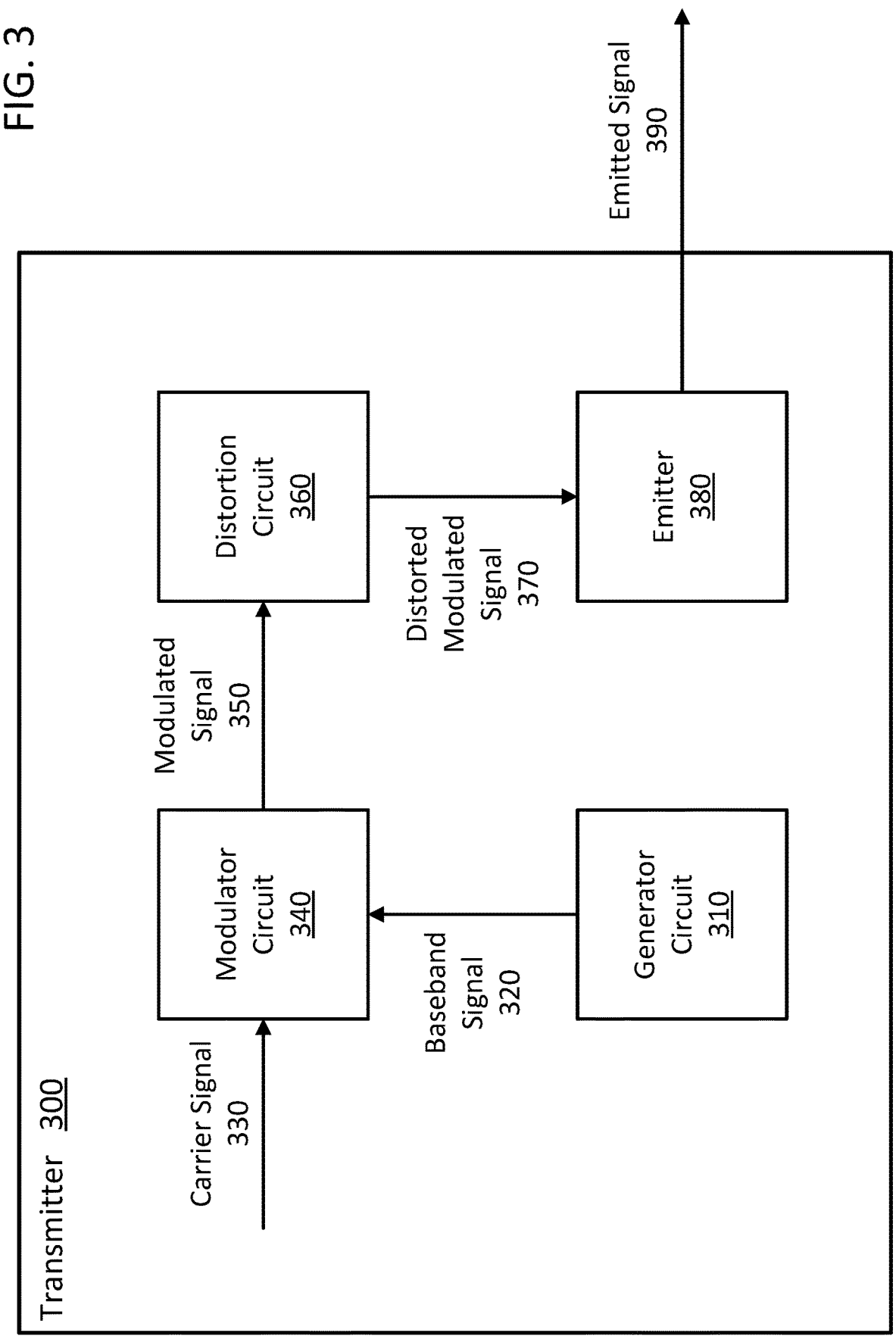
FIG. 3 is a block diagram of an example electronic transmitter using a distortion-based technique for communications localization denial, according to another embodiment of the present disclosure.

FIG. 3 is a block diagram of an example electronic transmitter 300 using a distortion-based technique for communications localization denial, according to another embodiment of the present disclosure. A generator circuit 310 generates a baseband signal 320 containing information content for an intended recipient. A modulator circuit 340 modulates a carrier signal 330 with the baseband signal 320, to generate a modulated signal 350. A distortion circuit 360 applies a distortion (such as an analog linear distortion or an analog nonlinear distortion) to the modulated signal 350, to generate a distorted modulated signal 370. An emitter 380 emits the distorted modulated signal 370 (as an emitted signal 390) at the intended recipient. For instance, the emitter 380 may amplify the distorted modulated signal 370, and use the amplified signal to drive an antenna, which emits the emitted signal 390. The distortion can be as described for the transmitter 200 of FIG. 2. When the distortion is a linear distortion, it can be applied at any stage of the signal generation (and can be digital or analog, depending on where the distortion is applied). The distortion can also be similar to that described above for the distortion circuit 230 of FIG. 2.

Figure 4:
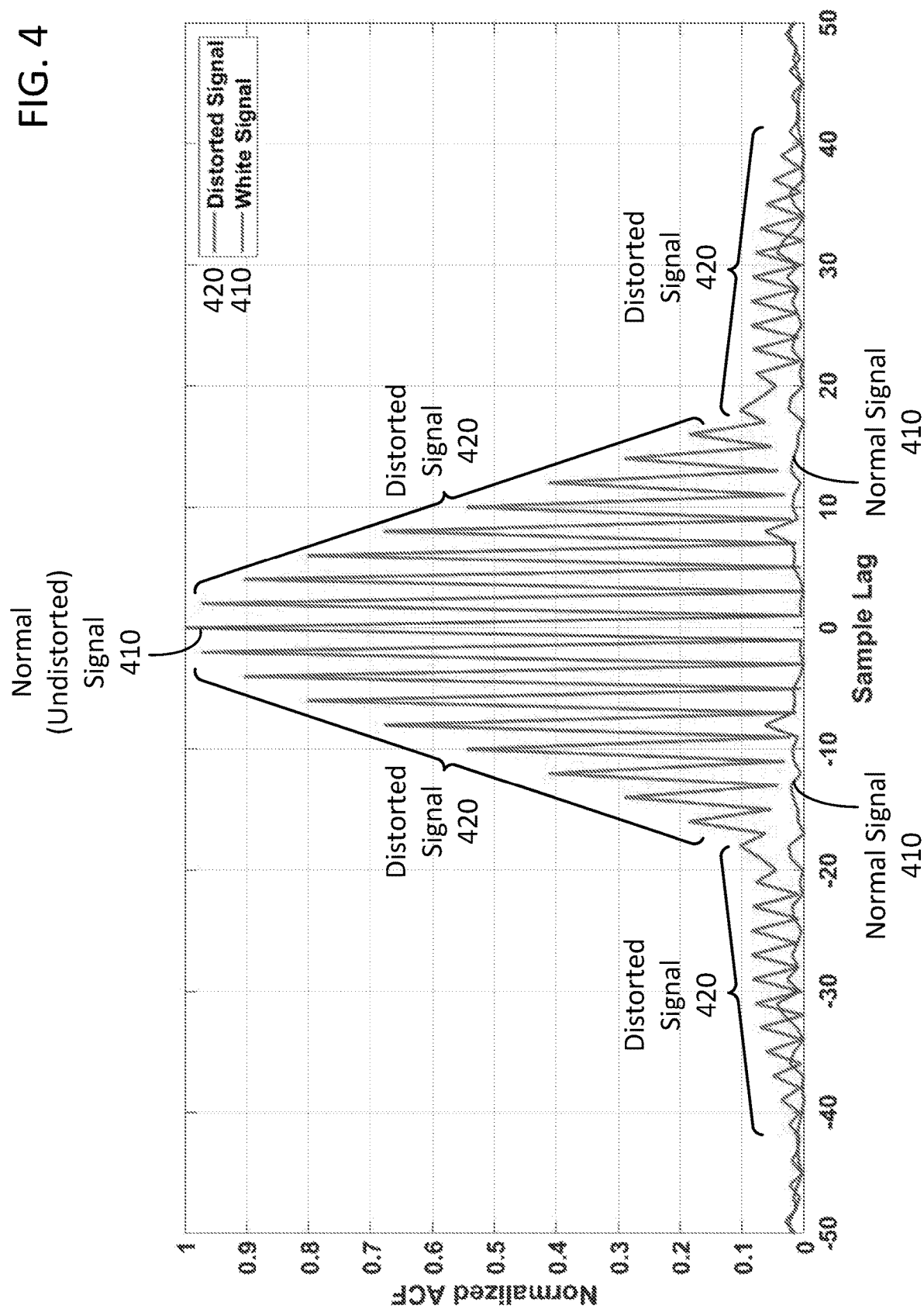
FIG. 4 is a graph comparing the normalized autocorrelation (ACF) of an example white or normal (undistorted) signal with that of an example distorted signal, generated according to an embodiment of the present disclosure.

FIG. 4 is a graph comparing the normalized autocorrelation (ACF) of an example white or normal (undistorted) signal 410 with that of an example distorted signal 420, generated according to an embodiment of the present disclosure. In FIG. 4, the x-axis (or horizontal axis) represents the sample lag (in sample intervals) while the y-axis (or vertical axis) represents the normalized ACF (as a fraction of the peak value or main lobe). Each of these two signals occupy 1 megahertz (MHz) of bandwidth. The normal signal 410 is a rectangular binary phase-shift keying (BPSK) signal possessing a flat power spectral density (PSD) while the distorted signal 420 has been passed through a filter (such as a linear transmit filter) that imparts distortion in the form of significant intersymbol interference (ISI). It should be noted that the normal signal 410 has sharp decay (peaks only at zero lag and is otherwise almost negligible) whereas the distorted signal 420 has a large number of secondary peaks that are comparable in magnitude to the main lobe.

At high signal to noise ratio (SNR), localization accuracy is mainly driven by the local width about the main (center) ACF lobe (that all or most unintended receivers can recognize) while at low SNR there is an increasingly higher probability that other peaks in the correlation will be incorrectly chosen (by some or all of the unintended recipients) to correspond with the estimated time delay, which can result in a large localization error. According to some embodiments, inducing high sidelobes (as in the distorted signal 420) in the ACF curve (using a distortion technique) thwarts efforts by unintended recipients to identify the peak or main lobe (as in the undistorted signal 410). Instead, different combinations of sidelobes are selected by the recipients, leading to very significant localization errors.

A localization estimate for the source of a transmission can be derived from correlation-based estimates of the time difference of arrival (TDOA) between multiple sensor pairs $\Delta_{ij} = \tau_j - \tau_i$. The Cramer Rao Lower Bound (CRLB) for the lowest attainable variance of $\Delta_{ij}$ is:

$$\text{var}(\Delta_{ij}) \geq CRLB(\sigma_{ij}) = \frac{0.55^2}{W^3 T \sigma_{ij}},$$

where W is the bandwidth of the communication link, T is the total observation interval, and is the effective SNR seen across the sensor pair. It is well-known that this bound is asymptotically tight at high SNR but loose at low SNR. Several substantially tighter large-error bounds that more accurately capture the threshold effect at low SNR include the McCaulay-Siedman (MS), Ziv-Zakai (ZZ), and most notably the Barankin Bound (BB). The Barankin Bound has been proven to represent the tightest lower bound however suffers from tractability issues since it involves an optimization over an infinite sequence of parameter test points.

For our purposes it is important to be able to approximate the threshold SNR (below which the large-error bounds experience a significant departure from the CRLB) with computational ease as it will be algorithmically exploited in the approach explained below. To that end, define this threshold SNR to be $\hat{\sigma}_{ij}$. A closed-form approximation of $\hat{\sigma}_{ij}$ that is both accurate and simple to calculate from the CRLB is:

$$\hat{\sigma}_{ij} \approx \frac{\pi \log\left(\frac{2}{0.55^2} W^3 T \varepsilon^2\right)}{2WT(1-\delta_1)},$$

where $\varepsilon$ is the spacing between the main and secondary peaks of $r_{ss}(\Delta_{ij})$, $r_{ss}(\Delta_{ij})=E[s(t)s^*(t-\Delta_{ij})]$ is the ACF of $s(t)$, $s(t)$ is the transmitted signal at time t, $\delta_1$ is the value of the secondary peak of $r_{ss}(r)$, and r is the absolute delay.

Figure 5:
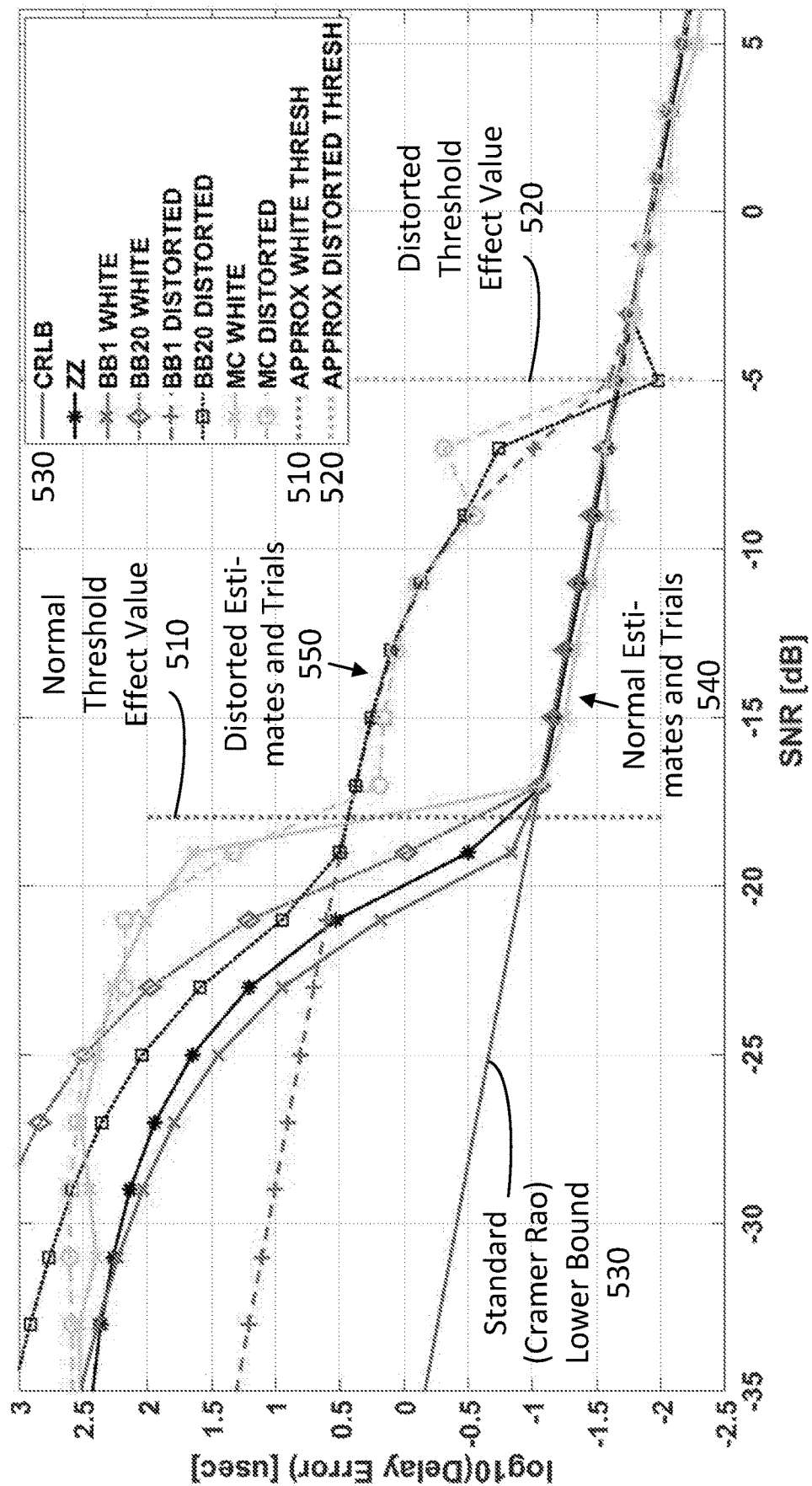
FIG. 5 is a graph comparing range estimate time-delay (or localization) errors for the normal (undistorted) and distorted signals of FIG. 4 as a function of signal to noise ratio (SNR), computed with both estimators and trials, together with threshold effect SNR values for when the normal and distorted signals achieve the standard lower bound for time-delay errors, according to embodiments of the present disclosure.

FIG. 5 is a graph comparing range estimate time-delay (or localization) errors (in microseconds or μsec, base 10 logarithm scale) for the normal (undistorted) and distorted signals of FIG. 4 as a function of signal to noise ratio (SNR, in decibels or dB), computed with both estimators and trials, together with threshold effect SNR values 510 and 520 for when normal and distorted signals, respectively, achieve the standard (Cramer Rao) lower bound 530 for time-delay errors, according to embodiments of the present disclosure. In FIG. 5, the x-axis (or horizontal axis) represents the SNR (in dB) while the y-axis (or vertical axis) represents the localization error (or time-delay error, in μsec, log scale). FIG. 5 illustrates several estimation bounds with regards to both signals and Monte Carlo (MC) trials for a particular time-delay estimator that is particularly effective at achieving sub-sample accuracy, a necessary condition to attain the Cramer-Rao Lower Bound (CRLB) 530 at high SNR. In FIG. 5, the BB1 and BB20 labels denote the Barankin Bound (tightest lower bound, especially for low SNR) computed for 1 set of test points and 20 sets of test points, respectively.

The normal threshold 510 and the distorted threshold 520 divide the plot in FIG. 5 into three regions. The left region (to the left of the normal threshold 510) represents that portion where both the normal and distorted signals exhibit large-error bounds (where the signals are difficult to localize). The central region (between the normal threshold 510 and the distorted threshold 520) represents the portion where only the distorted signal exhibits large-error bounds. As such, the central region is a band of SNRs (e.g., an extension of the left region) where the distortion significantly degrades localization attempts. As can be seen in the plot, the normal (undistorted) estimates and trials 540 drop down to the CRLB 530, while the distorted estimates and trials 550 remain significantly above the CRLB 530. The right region (to the right of the distorted threshold 520) represents the portion where both the normal and distorted signals behave close to the CRLB 530. As such, localization by passive recipients is usually possible at these SNRs, regardless of whether the distortion is applied.

Several interesting observations can be made from this plot, most notably that the MC results apparently violate each of the Barankin Bounds. This arises because the bounds are intended for unbiased estimation and at very low SNR with a fixed observation interval, time delay estimation becomes inherently biased. In addition, at exceedingly low SNR, there is little information to gain from the observations regarding the parameters and thus any estimate will be a guess within the observation interval. The bias arises since these guesses will always be restricted to lie within the interval.

The Ziv Zakai (ZZ) bound (another large-error bound that, like the Barankin Bound, more accurately captures the threshold effect at low SNR) correctly accounts for this bias.

The Ziv-Zakai bound is inherently a Bayesian bound and it can be seen from FIG. 5 that this bound is tight at low SNR. FIG. 5 also shows the dramatic effect that the signal distortion has on the threshold effect location; this is a direct result of the increased number and relative magnitude of ambiguity peaks (as illustrated in FIG. 4) within this signal's ACF. This behavior is accurately predicted by the Barankin Bound with even the secondary threshold region being correctly captured by the 20 test-point formulation. Note also that approximate (e.g., computed) SNR threshold effect values (e.g., −18 dB for the distorted signal 520 and −5 dB for the normal signal 510) for both signals have been overlaid on the plot showing the high degree of accuracy of the estimators and trials illustrated in FIG. 5.

Accordingly, in one or more embodiments of the present disclosure, by intentionally imparting distortion to the underlying signal, one can dramatically shift the location of the large-error threshold point to the right, thereby requiring a larger SNR in order to attain a given level of time delay estimation accuracy (which helps thwart localization techniques by unintended recipients). As such, in a communications application, one can either maintain the same operating point and guarantee further degradation of an adversarial passive localization system, or shift the operating point so as to coincide with the new threshold, which in turn admits a higher permissible transmission power level and thus, greater spectral efficiency. The above SNR threshold approximation can be used to efficiently determine a very accurate estimate of the threshold for the optimization problem to be discussed further below.

Distortion processing, such as distortion filtering, can induce an artificial frequency selective channel on the modulating waveform, which can degrade communications capacity (and thus tradeoff spectral efficiency for localization denial). However, since the channel is entirely controlled by the shape of the distortion (or distortion filter); it may be possible to optimize the distortion (such as optimizing the distortion filter) to favorably influence this tradeoff.

To this end, one or more embodiments optimize the filter coefficients that make up the nonzero elements at shifted locations within the filter matrix D (e.g., dr) as:

$$d^* = \underset{d \in C^L}{\operatorname{argmax}} C[d, \eta(d) - \sigma_0],$$

where $\eta(d)$ is the delay estimate large-error threshold SNR induced by the distortion filter d, $C[d,\eta(d)-\sigma_0]$ is the capacity (spectral efficiency in bits per second, per Hertz, or bits/sec/Hz) of a channel having impulse response d evaluated at the SNR $(\eta(d)-\sigma_0)$, L is the number of filter taps, which is assumed to be fixed, and $C^L$ is a distortion filter space (such as vectors of complex or real numbers representing corresponding tap values). The additional term $\sigma_0$ is meant to account for the difference in SNR between the interceptor and the friendly receiver. While the number of taps can also be optimized, after a small number (such as 15 or 25 taps), this can add relatively large computational complexity while adding relatively little improvement to the resulting distortion filter.

The above formula has an intuitive explanation. The covertness versus spectral efficiency tradeoff will be most favorable if the distortion filter d is designed such that the spectral efficiency at the friendly receiver is maximized when the interceptor is at its threshold SNR. There is a subtlety in the formula: while it appears as if the optimization is to maximize capacity uniformly without regard to impact on the interceptor, it is also the case that the capacity is optimized at the interceptor threshold point itself. That is, in order to favorably sway the tradeoff, the optimization has no choice but to design d* in such a way that the threshold effect value will move to the right while minimizing the deleterious effect d* may have on capacity. To this end, the above SNR threshold approximation can be used to provide a highly accurate estimate of η(d).

Figure 6:
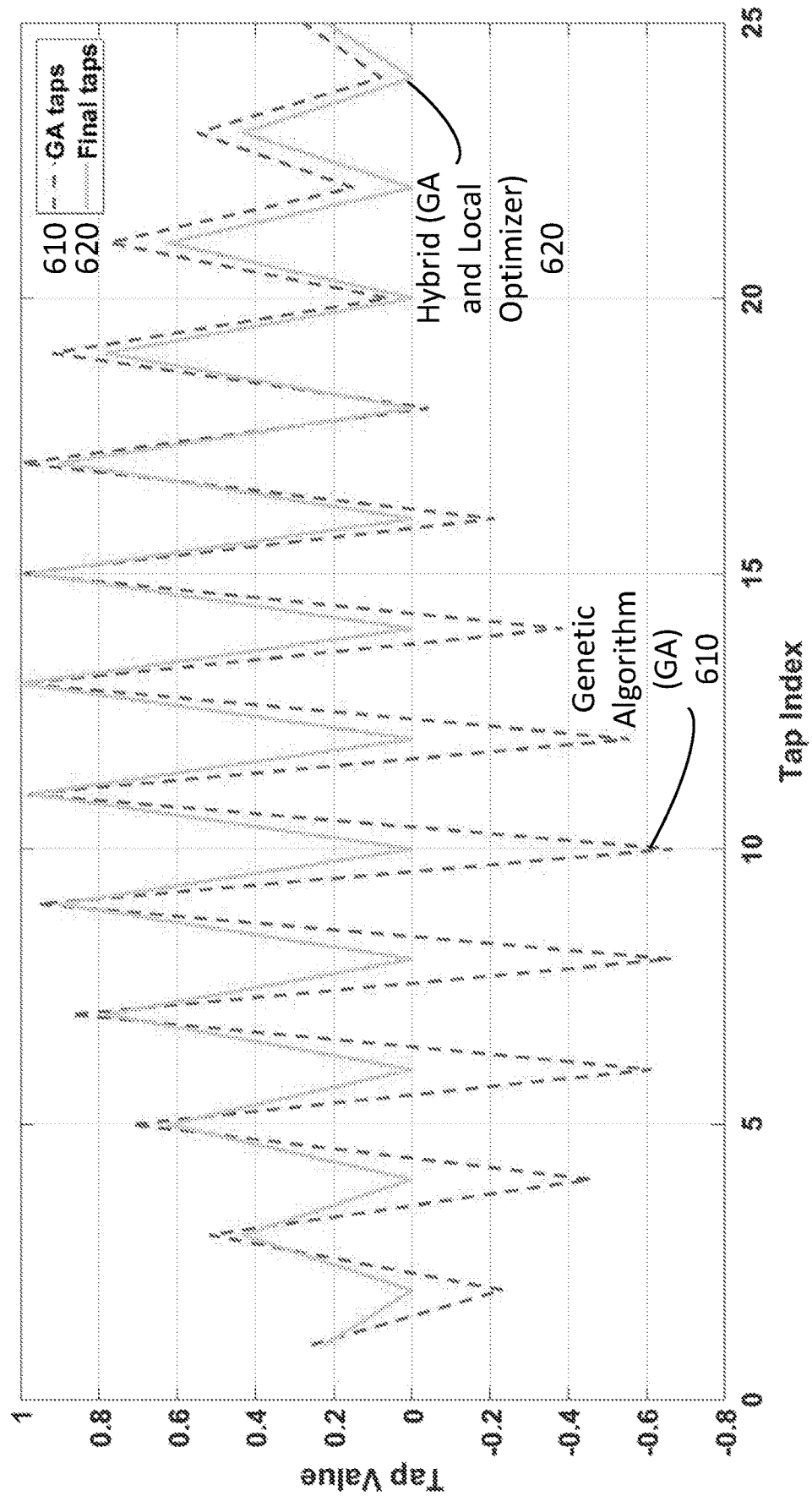
FIG. 6 is a graph of example optimized distortion filters having 25 taps, according to embodiments of the present disclosure.

FIG. 6 is a graph of example optimized distortion filters having 25 taps, according to embodiments of the present disclosure. FIG. 6 illustrates two sets of 25-tap distortion filters: one set generated by a genetic algorithm (GA, or GA set 610), and another set (a final set 620) generated by a hybrid approach using a local optimizer on the GA set 610 as a seed. In FIG. 6, the x-axis (or horizontal axis) represents the 25 different tap indices while the y-axis (or vertical axis) represents the magnitude of the tap value (as a fraction of the main lobe or strongest signal, with a tap value of 1 representing as strong as the main signal). It should be noted that a set of 25 taps is only an example, and in other embodiments, different numbers of taps can be used, such as 15, 20, 30, 40, or 50, to name a few. In some embodiments, the tap values are real numbers, while in some other embodiments, the tap values are complex numbers.

In one or more embodiments, a genetic algorithm (GA) is used as the optimization method to solve the above formula. There are several reasons for why this is a good approach. For one thing, the objective is non-convex and relatively high-dimensional, which excludes using a local optimizer by itself. Additionally, the specific nature of the objective function lends itself well to the mechanics of the GA framework. This is because it is the ACF of the filter (and its corresponding PSD) that drives the threshold SNR along with the resulting channel capacity. When represented as a summation, the ACF of a sequence is the sum of shorter summations. Sidelobes in the ACF are essentially a measure of self-similarity between shorter subsequences. When these constituent summations coherently sum, large sidelobes are formed. The distortion filter can be viewed as instantiating delayed and superimposed self-similar versions of the original signal. Some subsets of the filter coefficients will reinforce the sidelobes better than others. These subsets of filter coefficients can be abstracted as chromosomes while the filter coefficients (as a set) form candidate individuals in a genetic algorithm framework with the above formula as the fitness function.

As the GA evolves the population of candidate individuals, the fitness function progressively improves over generations. The GA avoids local maxima better than many other optimization approaches by inducing random mutations into the population, which may be retained if they result in an objective improvement. This allows a larger portion of the parameter space to be explored. To further improve the final results, the GA is followed up with a local optimizer to hone in on the maxima using the sequence generated by the GA as its seed. That is, the final technique is a hybrid approach of feeding the GA output as an initial guess into a local optimizer. FIG. 6 shows designed realvalued 25-tap filters, from both the GA and the hybrid approaches.

Figure 7:
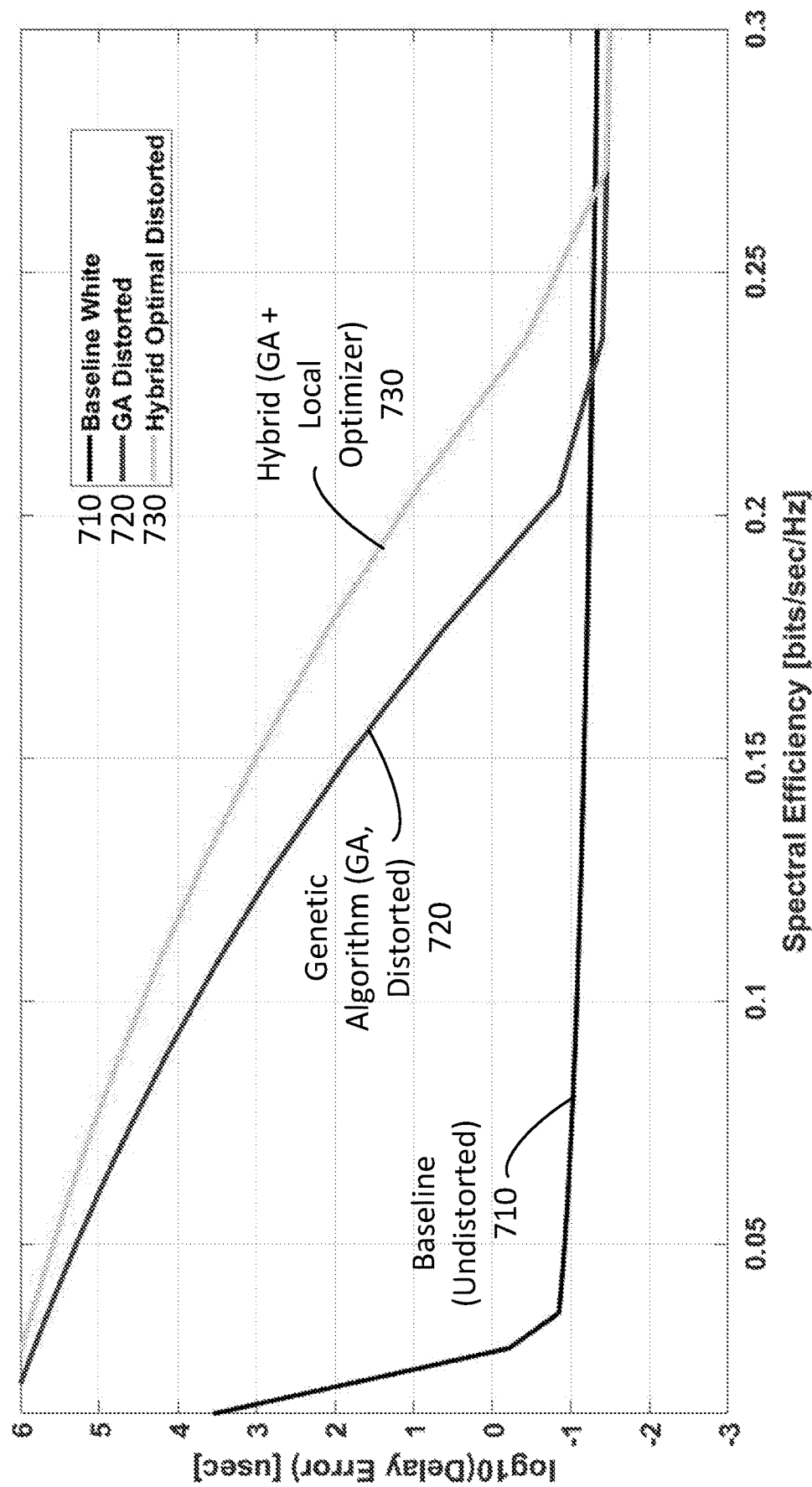
FIG. 7 is a graph comparing localization error versus spectral efficiency tradeoffs for a normal (undistorted) signal versus example optimized distortion filters, according to embodiments of the present disclosure.

FIG. 7 is a graph comparing localization error versus spectral efficiency tradeoffs for a normal (undistorted) signal versus example optimized distortion filters, according to embodiments of the present disclosure. The x-axis in FIG. 7 is spectral efficiency (in bits/sec/Hz) while the y-axis is the localization error (or time delay error, in μsec, log scale).

Shown in FIG. 7 is the resulting localization versus information transfer tradeoff curve for the baseline white signal 710 (e.g., undistorted) and the GA optimized distortion filters (for both the GA only approach 720 and the hybrid approach 730 adding a local optimizer to the GA output).

Figure 8:
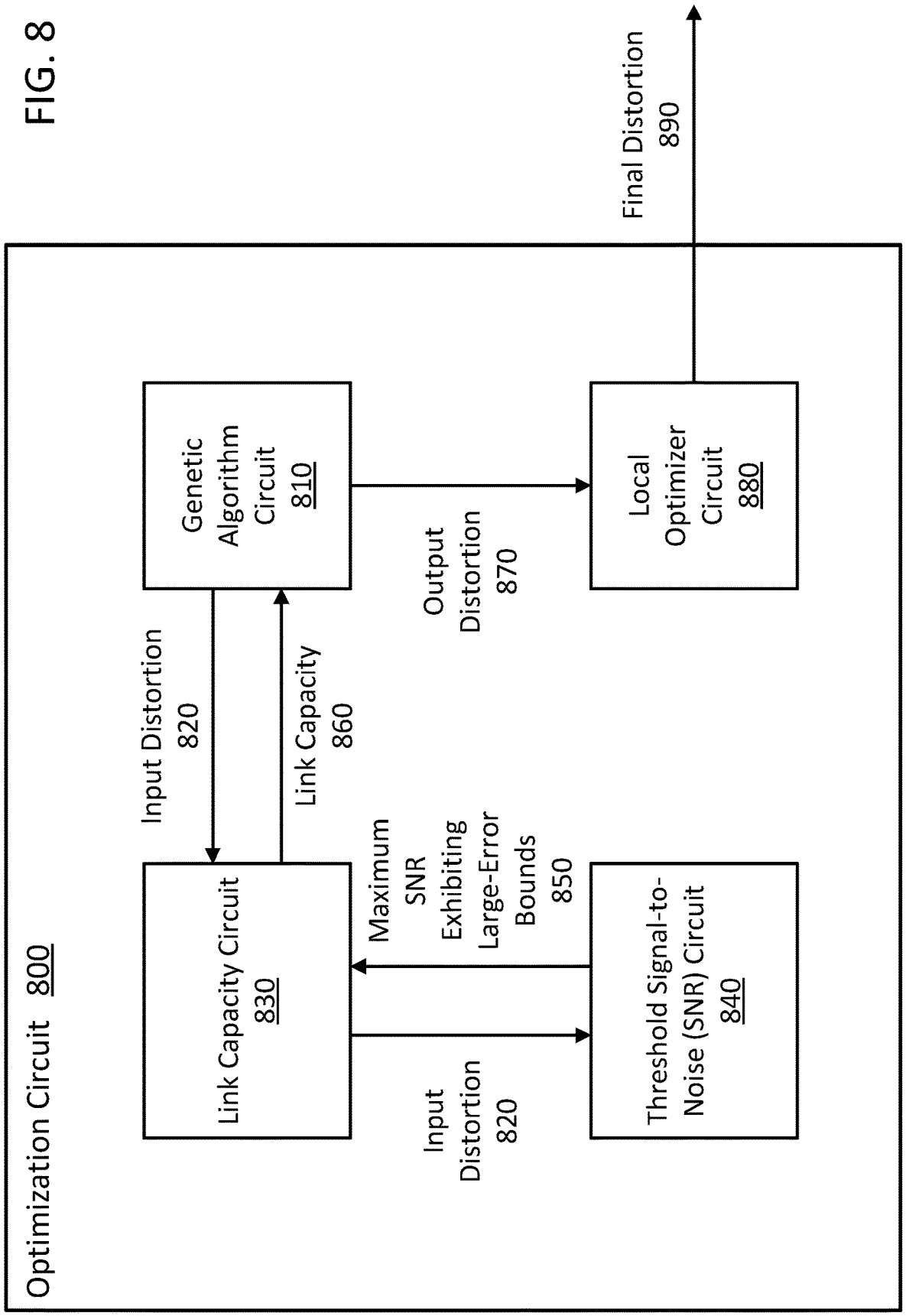
FIG. 8 is a block diagram of an example optimization circuit for generating a final distortion for communications localization denial, according to an embodiment of the present disclosure.

FIG. 8 is a block diagram of an example optimization circuit 800 for generating a final distortion 890 for communications localization denial, according to an embodiment of the present disclosure. The optimization circuit 800 includes a genetic algorithm circuit 810 to select one distortion, namely output distortion 870, that optimizes a link capacity 860 to an intended recipient. The output distortion 870 is chosen from among possible distortions, such as a large number of possible distortions, or all possible distortions having certain design parameters (such as tap values for a distortion filter). The link capacity 860 (or channel capacity) to the intended recipient is calculated, computed, or otherwise determined for a particular distortion, such as input distortion 820 selected by the genetic algorithm circuit 810, by a link capacity circuit 830. The link capacity 860 is a function of the input distortion 820 and an input threshold signal to noise ratio (SNR), the input threshold SNR being a function of the input distortion 820 and corresponding to a maximum SNR 850 exhibiting large-error bounds for the input distortion 820.

To this end, the optimization circuit 800 further includes a threshold SNR circuit 840 to compute (or otherwise determine) the maximum SNR 850 exhibiting the large-error bounds for the input distortion 820. The optimization circuit 800 further includes a local optimizer circuit 880 to apply a local optimizer to the output distortion 870 to generate the final distortion 890.

Numerous other architectures, systems, and embodiments will be apparent in light of this disclosure.

Methodology

FIG. 9 is a flow diagram of an example method 900 of electronic transmission using a distortion-based technique for communications localization denial, according to an embodiment of the present disclosure. The method 900 may be performed, for example, by the transmitter 200 of FIG. 2. More generally, the method 900 and other methods described herein may be implemented in hardware or combinations of hardware and software. For example, the method 900 may be implemented by the components and techniques of FIGS. 1-8. In some embodiments, the method 900 may be performed in conjunction with a special purpose processor, such as a signal processor.

In some other embodiments, some of the method 900 may be implemented as a series of computer instructions, such as software, firmware, or a combination of the two, together with one or more computer processors (e.g., one or more microprocessors). The instructions, when executed on a given processor, cause portions of the method 900 to be performed. For example, in one or more embodiments, a computer program product is provided. The computer program product includes one or more non-transitory machinereadable mediums (such as a compact disc, a DVD, a solid-state drive, a hard drive, RAM, ROM, on-chip processor cache, or the like) encoded with instructions that when executed by one or more processors cause portions of the method 900 (or other method described herein) to be carried out for electronic transmission using distortionbased techniques for communications localization denial. In addition, while the methods described herein may appear to have a certain order to their operations, other embodiments may not be so limited. Accordingly, the order of the operations can be varied between embodiments, as would be apparent in light of this disclosure.

The method 900 of FIG. 9 includes a generator circuit (such as generator circuit 210) generating 910 a baseband signal (such as baseband signal 220) and a distortion circuit (such as distortion circuit 230) applying 930 a final distortion (such as final distortion 890) to the baseband signal. The final distortion is optimized (such as with a genetic algorithm) to minimize the ability of unintended recipients (such as first surveillance 160 and second surveillance 170) to localize the transmitter (such as transmitter 200) or emitter (such as emitter 280) using correlation-based techniques, and to minimize any degradation to the data rate of the transmitted or emitted signal (such as emitted signal 290) at an intended recipient (such as intended recipient 150).

In the method 900, this final distortion is generated 920 by an optimization circuit (such as optimization circuit 800) by selecting one distortion (such as output distortion 870) that optimizes a link capacity (such as link capacity 860) to the intended recipient from among possible distortions. The link capacity is a function of an input distortion (such as input distortion 820) of the possible distortions and an input threshold signal to noise ratio (SNR). The input threshold SNR is a function of the input distortion and corresponds to a maximum SNR (such as maximum SNR 850) exhibiting large-error bounds for the input distortion. The method 900 further includes a modulator circuit (such as modulator circuit 260) modulating 940 a carrier signal (such as carrier signal 250) with the distorted baseband signal (such as distorted baseband signal 240). The method 900 further includes the emitter emitting 950 the modulated signal (such as modulated signal 270) at the intended recipient.

FIG. 10 is a flow diagram of an example method 1000 of electronic transmission using a distortion-based technique for communications localization denial, according to another embodiment of the present disclosure. The method 1000 may be performed, for example, using the transmitter 300 of FIG. 3. The method 1000 includes a generator circuit (such as generator circuit 310) generating 1010 a baseband signal (such as baseband signal 320) and a modulator circuit (such as modulator circuit 340) modulating 1020 a carrier signal (such as carrier signal 330) with the baseband signal. The method 1000 further includes a distortion circuit (such as distortion circuit 360) applying 1040 a final distortion to the modulated signal (such as modulated signal 350). The final distortion is optimized (such as with a genetic algorithm) to minimize the ability of unintended recipients to localize the transmitter (such as transmitter 300) using correlation-based techniques, and to minimize any degradation to the data rate of the transmitted signal (such as emitted signal 390) at an intended recipient.

In the method 1000, this final distortion is generated 1030 by an optimization circuit by selecting one distortion that optimizes a link capacity to the intended recipient from among possible distortions. The link capacity is a function of an input distortion of the possible distortions and an input threshold SNR. The input threshold SNR is a function of the input distortion and corresponds to a maximum SNR exhibiting large-error bounds for the input distortion. The method 1000 further includes an emitter (such as emitter 380) emitting 1050 the distorted modulated signal (such as distorted modulated signal 370) at the intended recipient.

FIG. 11 is a flow diagram of an example method 1100 of electronic generation of a final distortion (such as d* in the above optimization formula) for communications localization denial by applying to a signal (such as baseband signal 220) to be emitted from an electronic transmitter (such as transmitter 200) at an intended recipient, according to an embodiment of the present disclosure. The method 1100 can be performed, for example, by an optimization circuit. In some embodiments, the optimization circuit is part of the electronic transmitter or a communication system including the electronic transmitter. The method 1100 includes generating 1110, by the optimization circuit, possible distortions (such as the set $C^L$ described as part of the above optimization formula) of the signal to be emitted, and selecting a first distortion and a second distortion from among the possible distortions.

The method 1100 further includes determining 1120, by the optimization circuit, a first threshold signal to noise ratio (SNR, such as distorted threshold effect value 520, as computed by the above SNR approximation) corresponding to a maximum SNR exhibiting large-error bounds for the first distortion, and determining 1130, by the optimization circuit, a second threshold SNR corresponding to a maximum SNR exhibiting large-error bounds for the second distortion. The method 1100 further includes determining 1140, by the optimization circuit, a first link capacity (such as computing C in the above optimization formula) to the intended recipient, of the first distortion based on the determined first threshold SNR, and determining 1150, by the optimization circuit, a second link capacity to the intended recipient, of the second distortion based on the determined second threshold SNR. The method 1100 further includes choosing 1160, by the optimization circuit, one of the first distortion or the second distortion (such as performing the arg max function in the above optimization formula) based on which of the determined first link capacity or the determined second link capacity is greater.

Numerous other methods and techniques will be apparent in light of this disclosure.

FURTHER EXAMPLE EMBODIMENTS

The following examples pertain to further embodiments, from which numerous permutations and configurations will be apparent.

Example 1 is an electronic transmitter including: a generator circuit to generate a baseband signal; a modulator circuit to modulate a carrier signal with the baseband signal; an emitter to emit the modulated signal at an intended recipient; and a distortion circuit to apply a final distortion to the baseband signal or the modulated signal, the final distortion being optimized to minimize the ability of unintended recipients to localize the emitter using correlation-based techniques, and to minimize any degradation to the data rate of the emitted signal at the intended recipient.

Example 2 includes the transmitter of Example 1, wherein the final distortion is generated by an optimization circuit to select one distortion that optimizes a link capacity to the intended recipient from among possible distortions, the link capacity being a function of an input distortion of the possible distortions and an input threshold signal to noise ratio (SNR), the input threshold SNR being a function of the input distortion and corresponding to a maximum SNR exhibiting large-error bounds for the input distortion.

Example 3 includes the transmitter of Example 2, wherein the optimization circuit includes a genetic algorithm circuit to select the one distortion using a genetic algorithm, and a local optimizer circuit to apply a local optimizer to the selected distortion to generate the final distortion.

Example 4 includes the transmitter of Example 2, wherein the optimization circuit includes a threshold SNR circuit to compute the maximum SNR exhibiting the large-error bounds for the input distortion, and a link capacity circuit to compute the link capacity to the intended recipient from the input distortion using the computed maximum SNR exhibiting the large-error bounds for the input distortion.

Example 5 includes the transmitter of Example 2, further including the optimization circuit.

Example 6 includes the transmitter of Example 1, wherein the distortion circuit is further to apply the final distortion to the baseband signal, and the modulator circuit is further to modulate the carrier signal with the distorted baseband signal.

Example 7 includes the transmitter of Example 1, wherein the final distortion is a linear distortion.

Example 8 is an electronic communication system including: the transmitter of Example 1; and a receiver at the intended recipient, the receiver being aware of the final distortion and including a collector to collect the emitted signal, and a demodulator circuit to demodulate the collected signal using the final distortion to recover the baseband signal.

Example 9 is a method of electronic transmission, the method including: generating a baseband signal using a generator circuit; modulating a carrier signal with the baseband signal using a modulator circuit; emitting the modulated signal at an intended recipient using an emitter; and applying a final distortion to the baseband signal or the modulated signal using a distortion circuit, the final distortion being optimized to minimize the ability of unintended recipients to localize the emitter using correlation-based techniques, and to minimize any degradation to the data rate of the emitted signal at the intended recipient.

Example 10 includes the method of Example 9, further including generating, by an optimization circuit, the final distortion by selecting one distortion that optimizes a link capacity to the intended recipient from among possible distortions, the link capacity being a function of an input distortion of the possible distortions and an input threshold signal to noise ratio (SNR), the input threshold SNR being a function of the input distortion and corresponding to a maximum SNR exhibiting large-error bounds for the input distortion.

Example 11 includes the method of Example 10, wherein generating the final distortion includes using a genetic algorithm to select the one distortion, and applying a local optimizer to the selected distortion to generate the final distortion.

Example 12 includes the method of Example 10, wherein selecting the one distortion includes computing the maximum SNR exhibiting the large-error bounds for the input distortion, and computing the link capacity to the intended recipient from the input distortion using the computed maximum SNR exhibiting the large-error bounds for the input distortion.

Example 13 includes the method of Example 9, wherein applying the final distortion includes applying the final distortion to the baseband signal, and modulating the carrier signal includes modulating the carrier signal with the distorted baseband signal.

Example 14 includes the method of Example 9, wherein the final distortion is a linear distortion.

Example 15 is a method of electronic communication including: performing the method of electronic transmission of Example 9; collecting the emitted signal at the intended recipient using a collector; and demodulating the collected signal to recover the baseband signal using a demodulator circuit that is aware of the final distortion.

Example 16 is a method of electronically generating a final distortion using a processing circuit, the final distortion for communications localization denial by applying to a signal to be emitted from an electronic transmitter at an intended recipient, the method including: generating, by the processing circuit, possible distortions of the signal to be emitted; selecting, by the processing circuit, a first distortion and a second distortion from among the possible distortions; determining, by the processing circuit, a first threshold signal to noise ratio (SNR) corresponding to a maximum SNR exhibiting large-error bounds for the first distortion; determining, by the processing circuit, a second threshold SNR corresponding to a maximum SNR exhibiting large-error bounds for the second distortion; determining, by the processing circuit, a first link capacity to the intended recipient, of the first distortion based on the determined first threshold SNR; determining, by the processing circuit, a second link capacity to the intended recipient, of the second distortion based on the determined second threshold SNR; and choosing, by the processing circuit, one of the first distortion or the second distortion based on which of the determined first link capacity or the determined second link capacity is greater.

Example 17 includes the method of Example 16, wherein generating the possible distortions and selecting the first and second distortions is done using a genetic algorithm.

Example 18 includes the method of Example 17, further including generating, by the processing circuit, the final distortion by applying a local optimizer to a final chosen distortion of the possible distortions selected by the genetic algorithm.

Example 19 includes the method of Example 16, wherein determining the first and second threshold SNRs includes computing first and second maximum SNRs exhibiting the large-error bounds for the first and second distortions, respectively.

Example 20 includes the method of Example 16, wherein the possible distortions each include a vector of tap values for a corresponding number of taps.

Example 21 includes the method of Example 20, wherein the vector of tap values for the final distortion oscillates between a local maximum and a local minimum for consecutive taps.

Example 22 includes the method of Example 16, wherein the final distortion is a linear distortion.

Example 23 is a computer program product including one or more non-transitory machine-readable storage mediums having instructions encoded thereon for generating the final distortion by the method of Example 16 using the processing circuit.

Example 24 is a system for electronic distortion generation, the system including: the computer program product of Example 23; and the processing circuit to execute the encoded instructions to generate the final distortion.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. An electronic transmitter comprising:
  a generator circuit to generate a baseband signal;
  a modulator circuit to modulate a carrier signal with the baseband signal into a modulated signal;
  an emitter to emit the modulated signal to an intended recipient;
  an optimization circuit to select a distortion that optimizes a link capacity to the intended recipient from among a plurality of possible distortions;
    wherein the link capacity is a function of an input distortion of the plurality of possible distortions and an input threshold signal to noise ratio (SNR), and the input threshold SNR is a function of the input distortion and corresponds to a maximum SNR exhibiting large-error bounds for the input distortion; and
  a distortion circuit to apply a final distortion to the baseband signal or the modulated signal, the final distortion being optimized to minimize the ability of unintended recipients to localize the emitter using correlation-based techniques, and to minimize any degradation to a data rate of the emitted signal to the intended recipient.

2. The transmitter of claim 1, wherein the optimization circuit comprises a genetic algorithm circuit to select the distortion using a genetic algorithm, and a local optimizer circuit to apply a local optimizer to the selected distortion to generate the final distortion.

3. The transmitter of claim 1, wherein the optimization circuit comprises:
  a threshold SNR circuit to compute the maximum SNR exhibiting large-error bounds for the input distortion; and
  a link capacity circuit to compute the link capacity to the intended recipient from the input distortion using the computed maximum SNR exhibiting large-error bounds for the input distortion.

4. The transmitter of claim 1, wherein the distortion circuit is further to apply the final distortion to the baseband signal, and the modulator circuit is further to modulate the carrier signal with the distorted baseband signal.

5. The transmitter of claim 1, wherein the final distortion is a linear distortion.

6. The transmitter of claim 1 further comprising:
  a receiver, which is aware of the final distortion, located at the intended recipient, wherein the receiver comprises:
    a collector to collect the emitted signal, and
    a demodulator circuit to demodulate the collected signal using the final distortion to recover the baseband signal.

7. The transmitter of claim 1 wherein the distortion circuit introduces a plurality of echoes into the baseband signal.

8. The transmitter of claim 1 wherein the plurality of possible distortions each comprise a vector of tap values for a corresponding number of taps.

9. The transmitter of claim 8 wherein the vector of tap values for the final distortion oscillates between a local maximum and a local minimum for consecutive taps.

10. A method of electronic transmission, the method comprising:
  generating a baseband signal using a generator circuit;
  modulating a carrier signal with the baseband signal using a modulator circuit into a modulated signal;
  emitting the modulated signal to an intended recipient using an emitter;
  generating, by an optimization circuit, a final distortion by selecting a distortion that optimizes a link capacity to the intended recipient from among a plurality of possible distortions, wherein the link capacity is a function of an input distortion of the plurality of possible distortions and an input threshold signal to noise ratio (SNR), wherein the input threshold SNR is a function of the input distortion and corresponds to a maximum SNR exhibiting large-error bounds for the input distortion;
  applying the final distortion to the baseband signal or the modulated signal using a distortion circuit, the final distortion being optimized to minimize the ability of unintended recipients to localize the emitter using correlation-based techniques, and to minimize any degradation to a data rate of the emitted signal to the intended recipient.

11. The method of claim 10, wherein generating the final distortion comprises using a genetic algorithm to select the distortion, and applying a local optimizer to the selected distortion to generate the final distortion.

12. The method of claim 10, wherein selecting the distortion comprises computing the maximum SNR exhibiting large-error bounds for the input distortion, and computing the link capacity to the intended recipient from the input distortion using the computed maximum SNR exhibiting large-error bounds for the input distortion.

13. The method of claim 10, wherein applying the final distortion comprises applying the final distortion to the baseband signal, and modulating the carrier signal comprises modulating the carrier signal with the distorted baseband signal.

14. The method of claim 10, wherein the final distortion is a linear distortion.

15. The method of claim 10 further comprising:
  collecting the emitted signal at the intended recipient using a collector; and
  demodulating the collected signal to recover the baseband signal using a demodulator circuit that is aware of the final distortion.

16. A method of electronically generating a final distortion using a processing circuit, the final distortion for communications localization denial by applying to a signal to be emitted from an electronic transmitter to an intended recipient, the method comprising:
  generating, by the processing circuit, possible distortions of the signal to be emitted;
  selecting, by the processing circuit, a first distortion and a second distortion from among the possible distortions;
  determining, by the processing circuit, a first threshold signal to noise ratio (SNR) corresponding to a maximum SNR exhibiting large-error bounds for the first distortion;
  determining, by the processing circuit, a second threshold SNR corresponding to a maximum SNR exhibiting large-error bounds for the second distortion;

determining, by the processing circuit, a first link capacity to the intended recipient, of the first distortion based on the determined first threshold SNR;

determining, by the processing circuit, a second link capacity to the intended recipient, of the second distortion based on the determined second threshold SNR; and choosing, by the processing circuit, one of the first distortion or the second distortion based on which of the determined first link capacity or the determined second link capacity is greater.

17. The method of claim 16, wherein generating the possible distortions and selecting the first and second distortions is done using a genetic algorithm.

18. The method of claim 17, further comprising generating, by the processing circuit, the final distortion by applying a local optimizer to a final chosen distortion of the possible distortions selected by the genetic algorithm.

19. The method of claim 16, wherein determining the first and second threshold SNRs comprises computing first and second maximum SNRs exhibiting the large-error bounds for the first and second distortions, respectively.

20. The method of claim 16, wherein the possible distortions each comprise a vector of tap values for a corresponding number of taps.

21. The method of claim 20, wherein the vector of tap values for the final distortion oscillates between a local maximum and a local minimum for consecutive taps.

22. The method of claim 16, wherein the final distortion is a linear distortion.

\* \* \* \* \*